United States Patent
Li et al.

(10) Patent No.: US 11,506,907 B2
(45) Date of Patent: Nov. 22, 2022

(54) ANTI-TERMBLE MECHANISM, CAMERA MODULE USING SAME, AND ELECTRONIC DEVICE

(71) Applicant: TRIPLE WIN TECHNOLOGY (SHENZHEN) CO. LTD., Shenzhen (CN)

(72) Inventors: Yu-Shuai Li, Shenzhen (CN); Shin-Wen Chen, New Taipei (TW); Jing-Wei Li, Guangdong (CN); Jian-Chao Song, Guangdong (CN); Sheng-Jie Ding, Guangdong (CN)

(73) Assignee: TRIPLE WIN TECHNOLOGY (SHENZHEN) CO. LTD., Shenzhen (CN)

( * ) Notice: Subject to any disclaimer, the term of this patent is extended or adjusted under 35 U.S.C. 154(b) by 448 days.

(21) Appl. No.: 16/699,971

(22) Filed: Dec. 2, 2019

(65) Prior Publication Data
US 2021/0132406 A1    May 6, 2021

(30) Foreign Application Priority Data

Oct. 30, 2019   (CN) ........................ 201911047098.5

(51) Int. Cl.
*G02B 27/64*    (2006.01)
*G03B 5/00*    (2021.01)

(52) U.S. Cl.
CPC ............. *G02B 27/646* (2013.01); *G03B 5/00* (2013.01); *G03B 2205/0076* (2013.01)

(58) Field of Classification Search
CPC .......... G02B 27/646; G02B 7/02; G03B 5/00; G03B 2205/0076; G03B 2205/0007; G03B 30/00; H04N 5/23248; H04N 5/23264
USPC .................................................. 359/554–557
See application file for complete search history.

(56) References Cited

U.S. PATENT DOCUMENTS

| 10,175,499 B2 | 1/2019 | Howarth et al. | |
| 2015/0049209 A1* | 2/2015 | Hwang | G02B 7/09 348/208.11 |
| 2017/0285362 A1* | 10/2017 | Hu | G02B 7/04 |
| 2022/0060610 A1* | 2/2022 | Sugiura | G03B 5/00 |

FOREIGN PATENT DOCUMENTS

| CN | 107077044 A | 8/2017 |
| CN | 109856891 A | 6/2019 |

\* cited by examiner

*Primary Examiner* — Darryl J Collins
*Assistant Examiner* — Matthew Y Lee
(74) *Attorney, Agent, or Firm* — ScienBiziP, P.C.

(57) ABSTRACT

A mechanism to render a lens module immune to trembling and jarring includes a carrier, a support element movably mounted on the carrier, and a driving element. The driving element includes a conductive structure arranged on the carrier, a plurality of positive pads on the carrier, and a plurality of shape memory alloy (SMA) wires. The SMA wires are electrically connected to the positive pads and the conductive structure. When currents flow into the SMA wires via the positive pads, the SMA wires deform upon heating and pull on the conductive structure, thus the conductive structure drives the support element to rotate in a plane parallel to the carrier. A lens module and an electronic device including the mechanism are also disclosed.

12 Claims, 7 Drawing Sheets

ANTI-TERMBLE MECHANISM, CAMERA MODULE USING SAME, AND ELECTRONIC DEVICE

FIELD

The subject matter relates to image capturing.

BACKGROUND

A prime lens in an image-capturing device is a lens with only one fixed focal length, which has characteristics of fast focusing speed and stable imaging quality. However, if the prime lens is fixed hard in place, when the prime lens is shaken or made to tremble, an image quality will be lowered.

BRIEF DESCRIPTION OF THE DRAWINGS

Implementations of the present technology will now be described, by way of embodiments, with reference to the attached figures.

DETAILED DESCRIPTION

Figure 1:
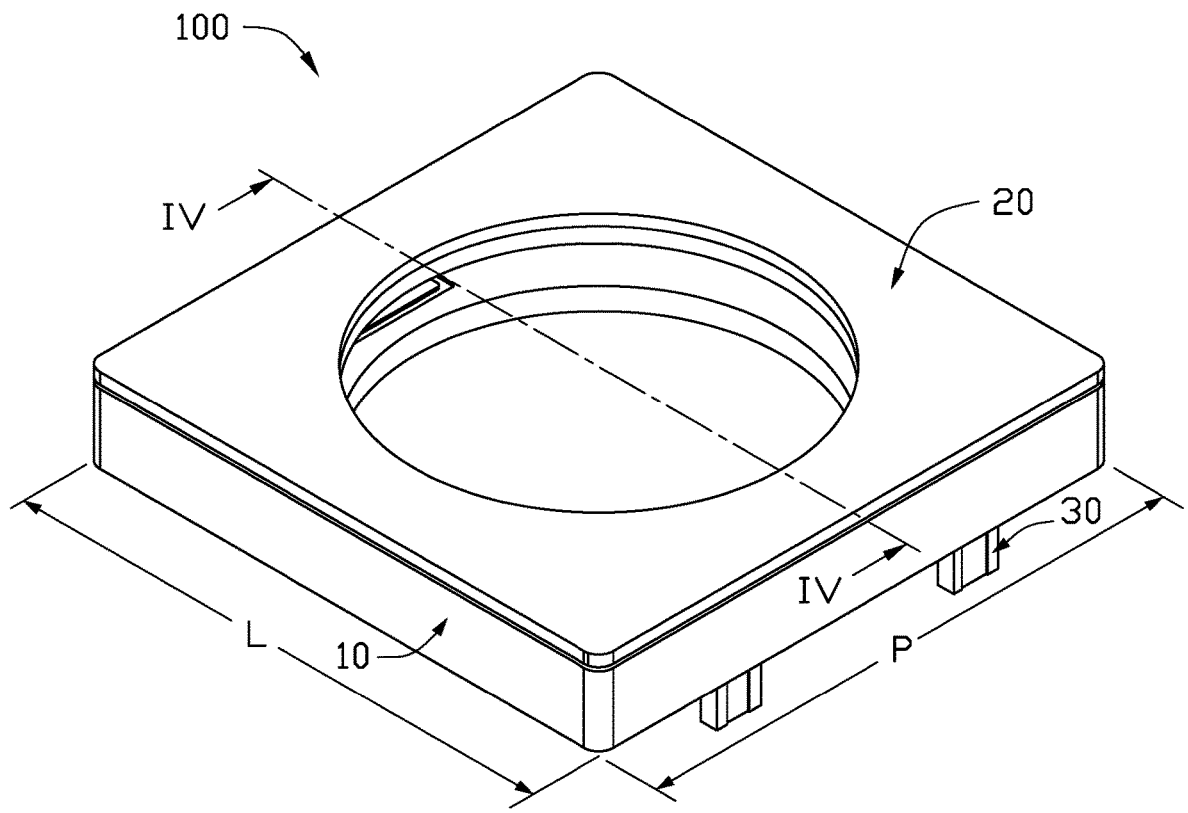
FIG. 1 is an isometric view of an embodiment of an anti-tremble mechanism.

It will be appreciated that for simplicity and clarity of illustration, where appropriate, reference numerals have been repeated among the different figures to indicate corresponding or analogous components. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

FIGS. 1 to 4 illustrate an embodiment of an anti-tremble mechanism 100. The anti-tremble mechanism 100 includes a carrier 10, a support element 20 movably mounted on the carrier 10, and a driving element 30 for driving the support element 20 to move relative to the carrier 10. The driving element 30 includes a conductive structure 31 arranged on the support element 20, a plurality of positive pads 32 arranged on the carrier 10, and a plurality of shape memory alloy (SMA) wires 33. The SMA wires 33 are all connected to the conductive structure 31, and are respectively connected to the positive pads 32. When electric current flows into the SMA wires 33 from the positive pads 32, each SMA wire 33 deforms upon being heated to generate a traction force F pulling on the conductive structure 31. The conductive structure 31, acting jointly by a plurality of the traction forces F of the SMA wires 31, drives the support element 20 to rotate in a plane parallel to the carrier 10. When electric current stops flowing into the SMA wires 33 from the positive pads 32, each SMA wire 33 returns to its original shape upon cooling. The plurality of the traction forces F disappears, thus the support element 20 returns to its original position. A direction of each traction force F is from the connection portion between each SMA wire 33 and the conductive structure 31 to the positive pad 32.

In one embodiment, the SMA wire 33 has memory in respect of shape, with thermoelasticity and conductivity. When electric current passes through the SMA wire 33, the SMA wire 33 is deformed on heating. When no electric current passes through the SMA wire 33, the SMA wire 33 returns to its original shape upon cooling. A linear relationship exists between a resistance and a length of the SMA wire 33.

When in use, a prime lens 201 (shown in FIG. 6) of a camera of a cellphone is arranged on the support element 20. When the prime lens 201 is shaken or jarred so as to rotate the support element 20 along a first direction in a plane parallel to the carrier 10, the driving element 30 of anti-tremble mechanism 100 drives the support element 20 to rotate along a negative direction of the first direction in the plane parallel to the carrier 10. Thus, any rotation of the prime lens 201 is compensated. The prime lens 201 can work normally in spite of the shaking. A predetermined linear exists between a resistance and a length of the SMA wire 33. The anti-tremble mechanism 100 can prestore an original length of the SMA wire 33. When the prime lens 201 rotates, the anti-tremble mechanism 100 first calculates a theoretical length of SMA wire 33 which will compensate for the rotation of the prime lens 201, and then calculates the change of the resistance value of the SMA wire 33 according to the difference between the theoretical length and the original length and the linear relationship, and calculates a value of current required. When an electric current of the value of current required is input to the SMA wire 33, the rotation of the prime lens 201 can be precisely compensated.

In one embodiment, the conductive structure 31 and the carrier 10 are both substantially rectangular in the shape of a frame. The conductive structure 31 includes four first vertexes 311. The carrier 10 includes four second vertexes 101 corresponding in positions to the first vertexes 311. The driving element 30 includes four SMA wires 33. One end of each SMA wire 33 is connected to one first vertex 311 of the conductive structure 31, and another one end of each SMA wire 33 is connected to one second vertex 101 of the carrier 10. The first vertex 311 and the second vertex 101 connected to the same SMA wire 33 are staggered, thus the conductive structure 31 can be pulled along different directions by the four SMA wires 33 to rotate in the plane.

Figure 4:
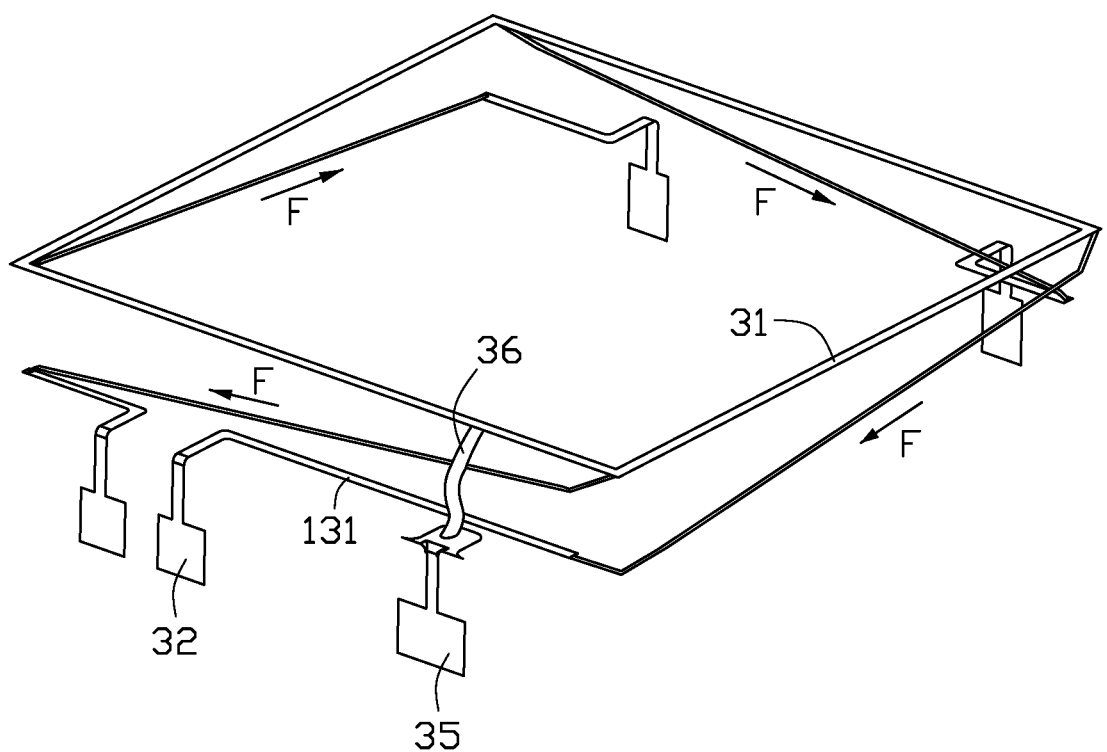
FIG. 4 is a wiring diagram of conductive elements of the mechanism of FIG. 1.
Figure 5:
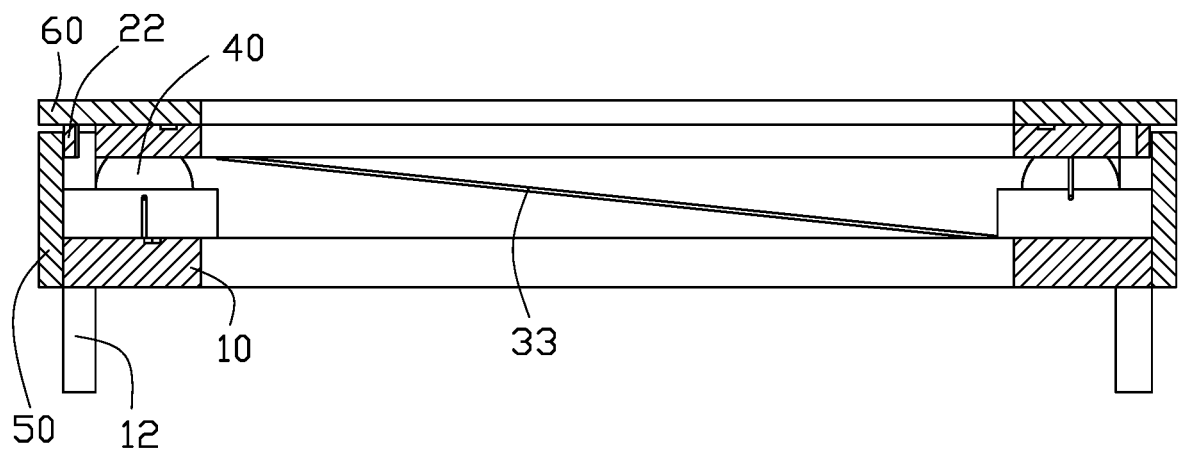
FIG. 5 is a cross-sectional view taken along line V-V of FIG. 1.

FIG. 4 illustrates that, when the prime lens 201 is rotated anticlockwise, electric currents are applied to opposite SMA wires 33, a clockwise torque of the conductive structure 31 is produced, thus the conductive structure 31 rotates clockwise to compensate for an anticlockwise rotation.

The driving element 30 further includes a negative pad 35 arranged on the carrier 10 and a conductive wire 36 electrically connected to the conductive structure 31 and the negative pad 35. Electric currents input from the positive pads 32 pass through the SMA wires 33, the conductive structure 31, the conductive wire 36 successively to flow into the negative pad 35. The SMA wires 33 are arranged, in parallel with each other, between the positive pads 32 and the negative pad 35. Each SMA wire 33 can be supplied with different values of electric currents to generate different traction forces F, thus the conductive structure 31 is driven to move and drives the support element 20 to move.

The carrier 10 includes a base body 102 and a plurality of protrusions 12 extending from a surface of the base body 102 away from the support element 20. The four second vertexes 101 are defined on the base body 102. The positive pads 32 and the negative pad 35 are arranged on surfaces of the protrusions 12.

A plurality of lead grooves 13 are defined between the second vertexes 101 and the protrusions 12. Conductive circuits 131 are arranged in the lead grooves 13. Part of the conductive circuits 131 are electrically connected to the positive pads 32 and the SMA wires 33, and another part of the conductive circuits 131 are electrically connected to the negative pad 35 and the conductive wire 36.

In one embodiment, materials of the carrier 10, the protrusions 12, and the support element 20 are polyamide, polycarbonate, polyester, or liquid crystal polymer, etc.

In one embodiment, the conductive structure 31 is formed on a side of the support element 20 away from the carrier 10 by a laser direct structuring process, the conductive circuits 131 are formed on a side of the carrier 10 and protrusions 12 adjacent to the support element 20.

Figure 2:
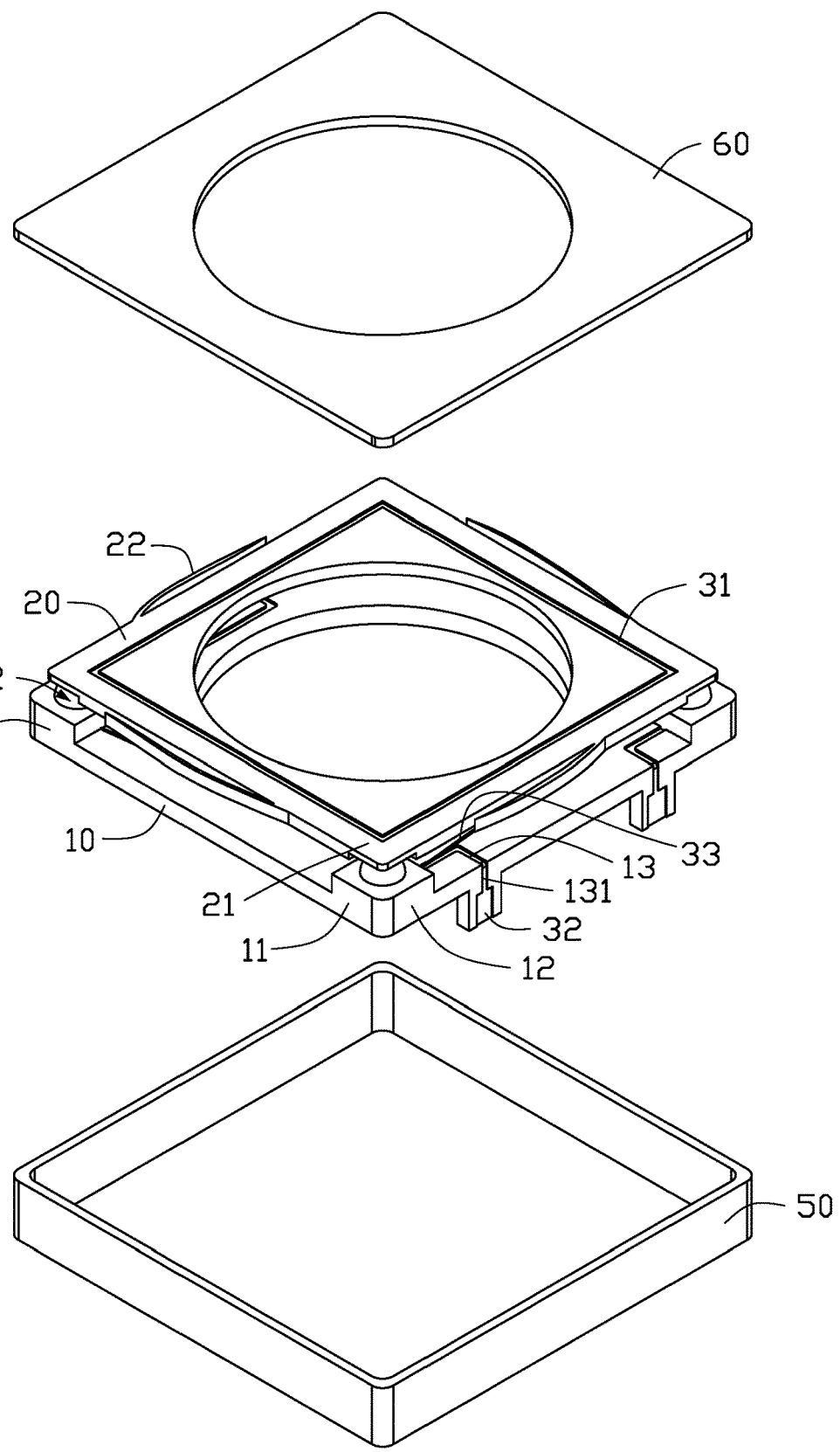
FIG. 2 is an exploded, isometric view of the mechanism of FIG. 1.
Figure 3:
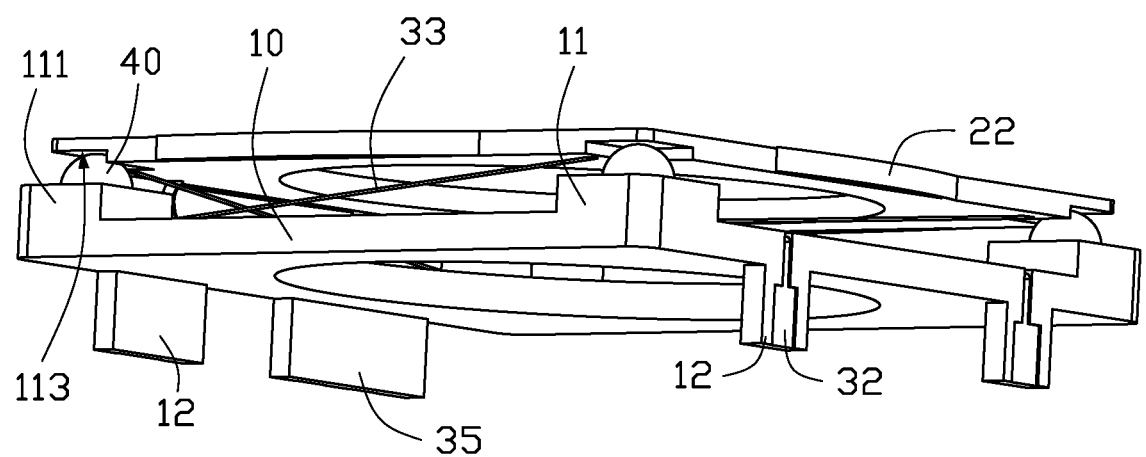
FIG. 3 is an isometric view of the mechanism without a housing and a cover.

FIGS. 2 to 4 illustrate that base body 102 carries a plurality of support portions 111 protruding from sides of the second vertexes 101 facing the support element 20. The support portion 111 defines a first hole 112, the support element 20 defines a second hole 113 corresponding in position to the first hole 112. A movable ball bearing 40 is received partly in the first hole 112 and partly in the second hole 113. The ball bearing 40 supports the support element 20, and the support element 20 is movably connected to the carrier 10 via the ball bearing 40. When the support element 20 rotates relative to the carrier 10, the ball bearing 40 moves in the second hole 113 relative to the support element 20, thus the support element 20 can move stably relative to the carrier 10. A gap is defined between an inner wall of the second hole 113 and the ball bearing 40, thus the support element can be rotated.

FIGS. 1-3 and 5 illustrate that the anti-tremble mechanism 100 further includes a housing 50. The housing 50 is sleeved on an outside of the support element 20 and the carrier 10. A plurality of elastic elements 22 is arranged on the outside of the support element 20 and the elastic elements 22 resist against an inner side of the housing 50. The elastic elements 22 will restore the support element 22 to its original position.

The anti-tremble mechanism 100 further includes a cover 60. The cover 60 is connected to the support element 20 and the prime lens 201 and covers the housing 50.

Figure 6:
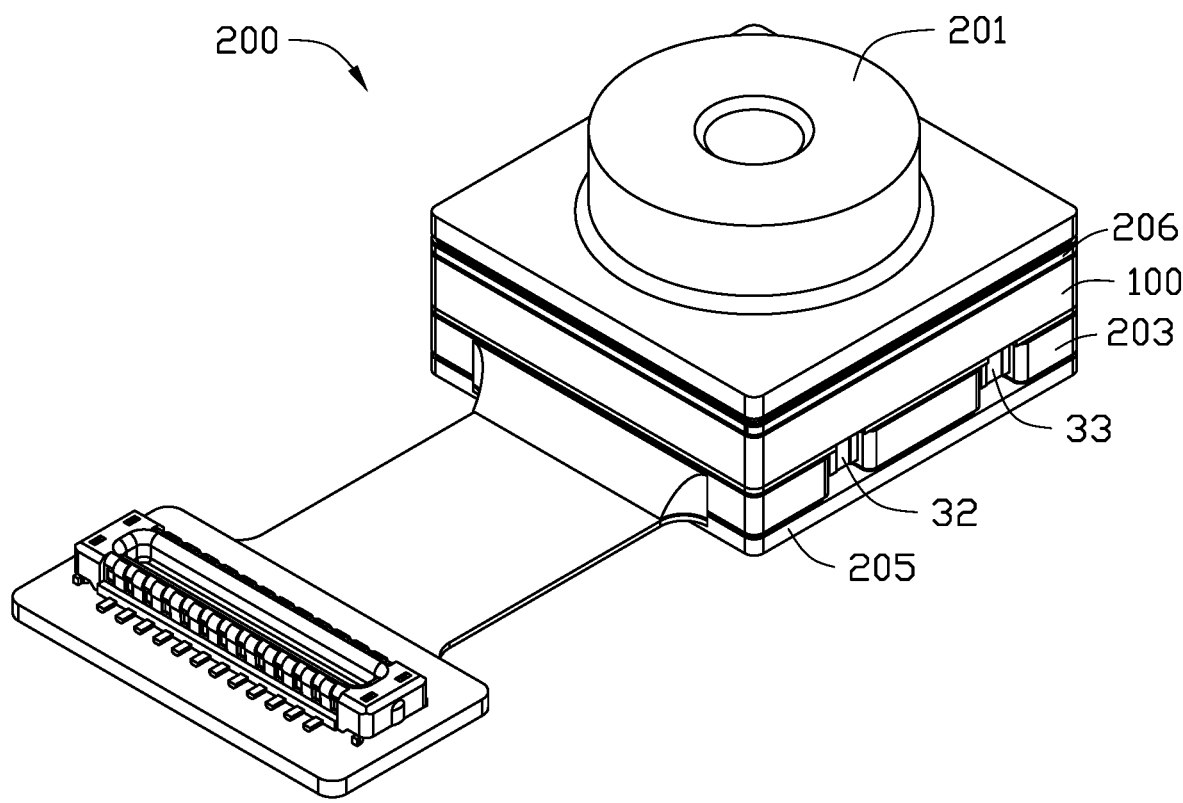
FIG. 6 is an isometric view of an embodiment of a camera module.

FIG. 6 illustrates an embodiment of a camera module 200. The camera module 200 includes a prime lens 201, the anti-tremble mechanism 100, an optical filter (not shown), a lens holder 203, an image sensor (not shown), and a circuit board 205 connected to each other in that order. The prime lens 201 is fixed to the cover 60 of the anti-tremble mechanism 100 via an adhesive layer 206. The circuit board 205 is electrically connected to the positive pads 32 and the negative pad 35 of the anti-tremble mechanism 100. The circuit board 205 further includes a position sensor (not shown), which detects state information, such as motion speed or acceleration, of the camera module 200, and processes the state information to calculate different values of electric current to pass through each SMA wire 33.

Figure 7:
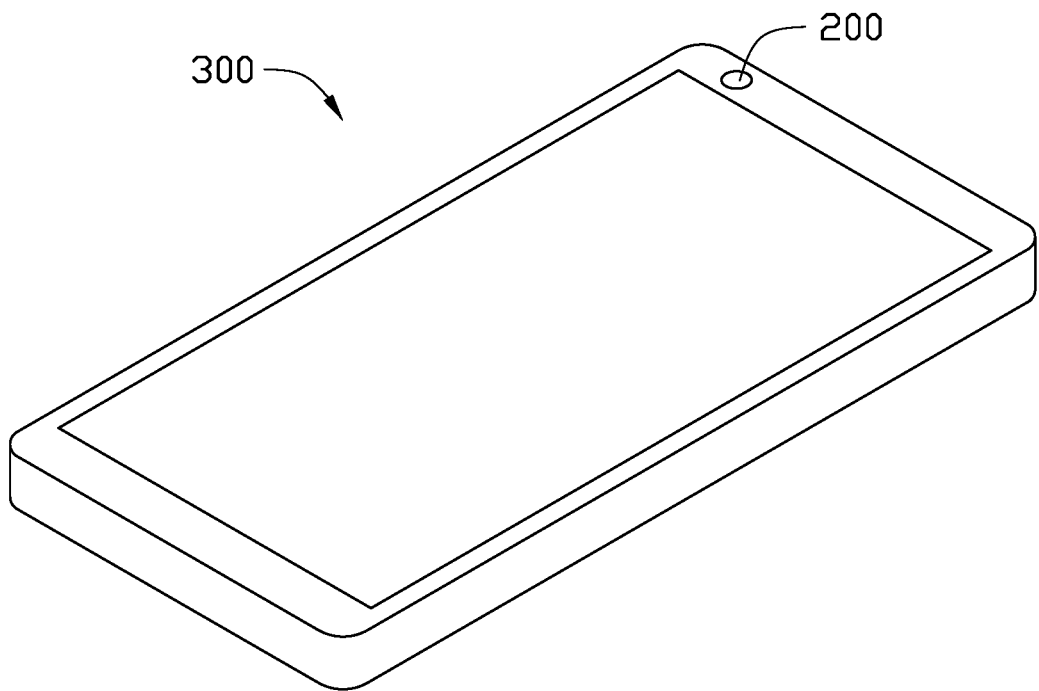
FIG. 7 is an isometric view of an embodiment of an electronic device.

FIG. 7 illustrates an embodiment of an electronic device 300 including the said camera module 200. The electronic device 300 can be any electronic device having imaging capturing functions, such as mobile phones, wearable devices, computer devices, vehicles, or monitoring devices.

Even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present exemplary embodiments, to the full extent indicated by the plain meaning of the terms in which the appended claims are expressed.

What is claimed is:

1. An anti-tremble mechanism comprising:
a carrier;
a support element movably mounted on the carrier; and
a driving element configured for driving the support element to move relative to the carrier, the driving element comprising:
a conductive structure arranged on the support element,
a plurality of positive pads arranged on the carrier, and
a plurality of shape memory alloy wires electrically coupled to the plurality of positive pads respectively, the plurality of shape memory alloy wires electrically coupled to the conductive structure;
wherein when currents flow into the plurality of shape memory alloy wires via the plurality of positive pads, the shape memory alloy wires deform to generate a plurality of traction forces F pulling on the conductive structure, thus the conductive structure drives the support element to rotate in a plane parallel to the carrier;
wherein when currents stop flowing into the plurality of shape memory alloy wires, the plurality of shape memory alloy wires return to original shapes, thus the support element returns to an original position;
wherein the conductive structure is frame-shaped and comprises four first vertexes, the driving element further comprises a negative pad arranged on the carrier and a conductive wire electrically coupled to the conductive structure and the negative pad, the carrier comprises a base body and a plurality of protrusions protruding from a surface of the base body away from the support element, the plurality of positive pads and the negative pad are arranged on the plurality of protrusions;
wherein a plurality of lead grooves are defined between the four first vertexes and the plurality of protrusions, the plurality of lead grooves carry a plurality of conductive circuits, part of the plurality of conductive circuits are electrically coupled to the plurality of positive pads and the plurality of the shape memory alloy wires, another part of the plurality of conductive circuits are electrically coupled to the negative pad and the conductive wire.

2. The anti-tremble mechanism of claim 1, wherein the carrier comprises four second vertexes defined on the base body and corresponding in position to the four first vertexes, one end of each of the plurality of shape memory alloy wires is coupled to one of the first vertexes, another one end of each of the plurality of shape memory alloy wires is coupled to one of the second vertexes, the first vertex and the second vertex coupled to the same shape memory alloy wire are staggered from each other.

3. The anti-tremble mechanism of claim 2, wherein the base body carries a plurality of support portions respectively arranged on sides of the four second vertexes facing the support element, each of the plurality of support portions defines a first hole, the support element defines a second hole corresponding in position to the first hole, a ball bearing is movably received in the first hole and the second hole.

4. The anti-tremble mechanism of claim 1, further comprising a housing, wherein the housing is sleeved on an outside of the support element and the carrier, a plurality of elastic elements are arranged between the support element and the housing to restore the support element.

5. The anti-tremble mechanism of claim 1, wherein materials of the carrier and the support element are polyamide, polycarbonate, polyester, or liquid crystal polymer.

6. A lens module comprising an anti-tremble mechanism, the anti-tremble mechanism comprising:
　a carrier;
　a support element movably mounted on the carrier; and
　a driving element configured for driving the support element to move relative to the carrier, the driving element comprising:
　　a conductive structure arranged on the support element,
　　a plurality of positive pads arranged on the carrier, and
　　a plurality of shape memory alloy wires electrically coupled to the plurality of positive pads respectively, the plurality of shape memory alloy wires electrically coupled to the conductive structure;
　wherein when currents flow into the plurality of shape memory alloy wires via the plurality of positive pads, the shape memory alloy wires deform to generate a plurality of traction forces F pulling on the conductive structure, thus the conductive structure drives the support element to rotate in a plane parallel to the carrier;
　wherein when currents stop flowing into the plurality of shape memory alloy wires, the plurality of shape memory alloy wires return to original shapes upon cooling, thus the support element returns to an original position;
　wherein the conductive structure is frame-shaped and comprises four first vertexes, the driving element further comprises a negative pad arranged on the carrier and a conductive wire electrically coupled to the conductive structure and the negative pad, the carrier comprises a base body and a plurality of protrusions protruding from a surface of the base body away from the support element, the plurality of positive pads and the negative pad are arranged on the plurality of protrusions;
　wherein a plurality of lead grooves are defined between the four first vertexes and the plurality of protrusions, the plurality of lead grooves carry a plurality of conductive circuits, part of the plurality of conductive circuits are electrically coupled to the plurality of positive pads and the plurality of the shape memory alloy wires, another part of the plurality of conductive circuits are electrically coupled to the negative pad and the conductive wire.

7. The lens module of claim 6, wherein the carrier comprises four second vertexes defined on the base body and corresponding in position to the four first vertexes, one end of each of the plurality of shape memory alloy wires is coupled to one of the first vertexes, another one end of each of the plurality of shape memory alloy wires is coupled to one of the second vertexes, the first vertex and the second vertex coupled to the same shape memory alloy wires are staggered from each other.

8. The lens module of claim 7, wherein the base body carries a plurality of support portions respectively arranged on sides of the four second vertexes facing the support element, each of the plurality of support portions defines a first hole, the support element defines a second hole corresponding in position to the first hole, a ball bearing is movably received in the first hole and the second hole.

9. The lens module of claim 6, further comprising a housing, wherein the housing is sleeved on external of an outside of the support element and the carrier, a plurality of elastic elements are arranged between the support element and the housing to restore the support element.

10. The lens module of claim 6, wherein materials of the carrier and the support element are polyamide, polycarbonate, polyester, or liquid crystal polymer.

11. An electronic device comprising a lens module, the lens module comprising an anti-tremble mechanism, the anti-tremble mechanism comprising:
　a carrier;
　a support element movably mounted on the carrier; and
　a driving element configured for driving the support element to move relative to the carrier, the driving element comprising:
　　a conductive structure arranged on the support element,
　　a plurality of positive pads arranged on the carrier, and
　　a plurality of shape memory alloy wires electrically coupled to the plurality of positive pads respectively, the plurality of shape memory alloy wires electrically coupled to the conductive structure;
　wherein when currents flow into the plurality of shape memory alloy wires via the plurality of positive pads, the shape memory alloy wires deform to generate a plurality of traction forces F pulling on the conductive structure, thus the conductive structure drives the support element to rotate in a plane parallel to the carrier;
　wherein when currents stop flowing into the plurality of shape memory alloy wires, the plurality of shape memory alloy wires return to original shapes, thus the support element returns to an original position;
　wherein the conductive structure is frame-shaped and comprises four first vertexes, the driving element further comprises a negative pad arranged on the carrier and a conductive wire electrically coupled to the conductive structure and the negative pad, the carrier comprises a base body and a plurality of protrusions protruding from a surface of the base body away from the support element, the plurality of positive pads and the negative pad are arranged on the plurality of protrusions;
　wherein a plurality of lead grooves are defined between the four first vertexes and the plurality of protrusions, the plurality of lead grooves carry a plurality of conductive circuits, part of the plurality of conductive circuits are electrically coupled to the plurality of positive pads and the plurality of the shape memory alloy wires, another part of the plurality of conductive circuits are electrically coupled to the negative pad and the conductive wire.

12. The electronic device of claim 11, wherein the carrier comprises four second vertexes defined on the base body and corresponding in position to the four first vertexes, one end of each of the plurality of shape memory alloy wires is coupled to one of the first vertexes, another one end of each of the plurality of shape memory alloy wires is coupled to one of the second vertexes, a first vertex and a second vertex coupled to the same shape memory alloy wire are staggered from each other.

\* \* \* \* \*